United States Patent Office 3,097,465
Patented July 16, 1963

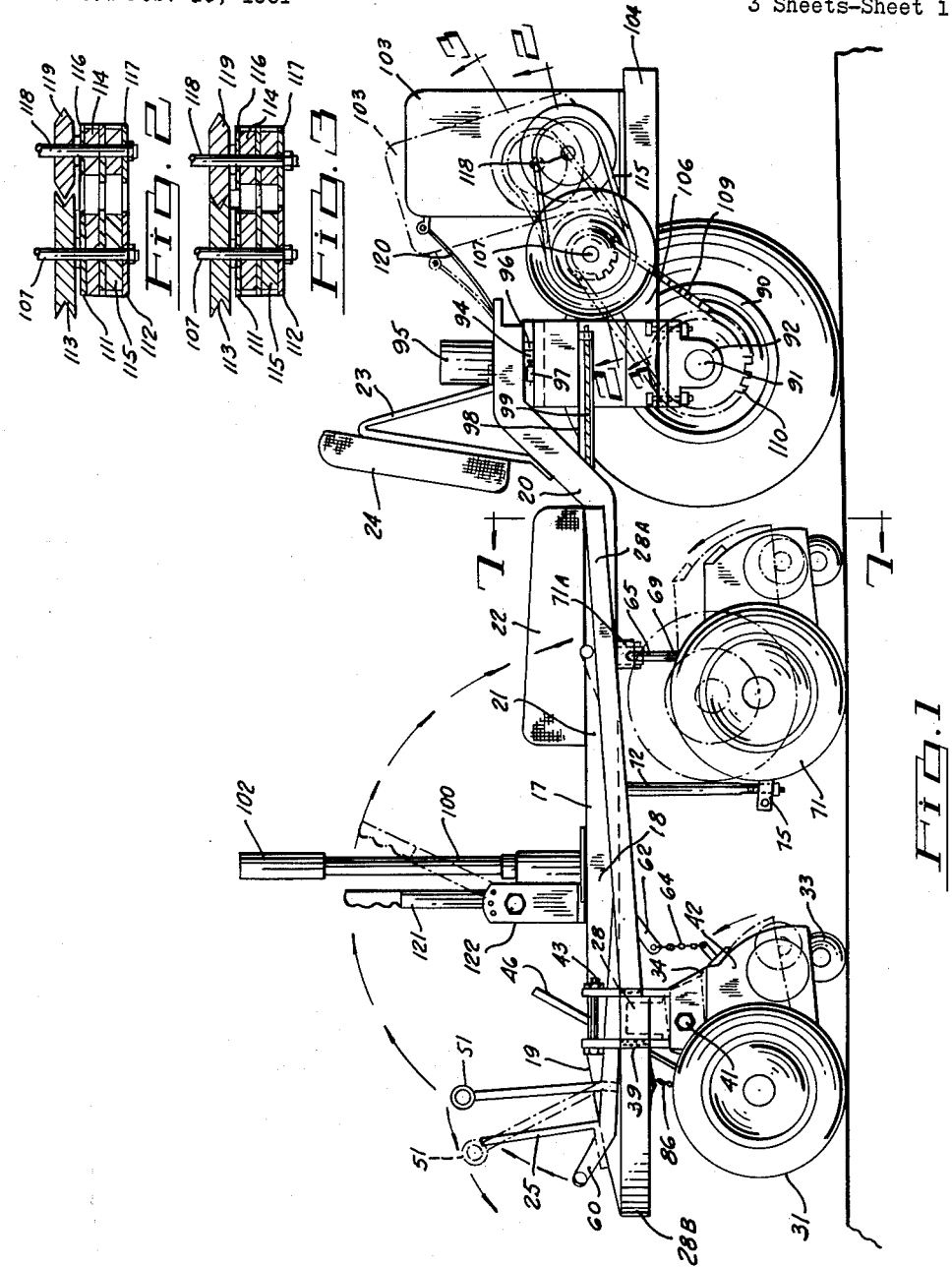

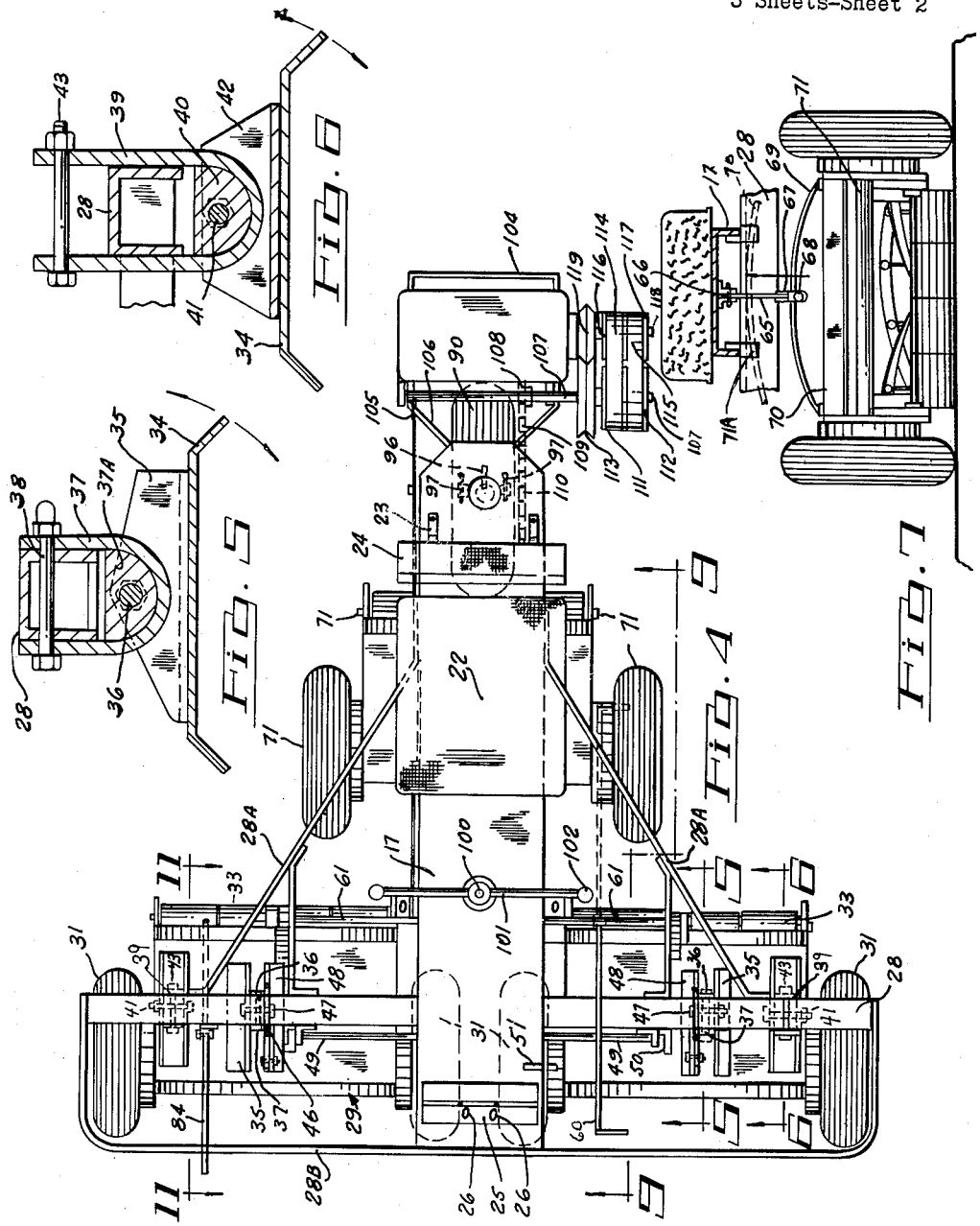

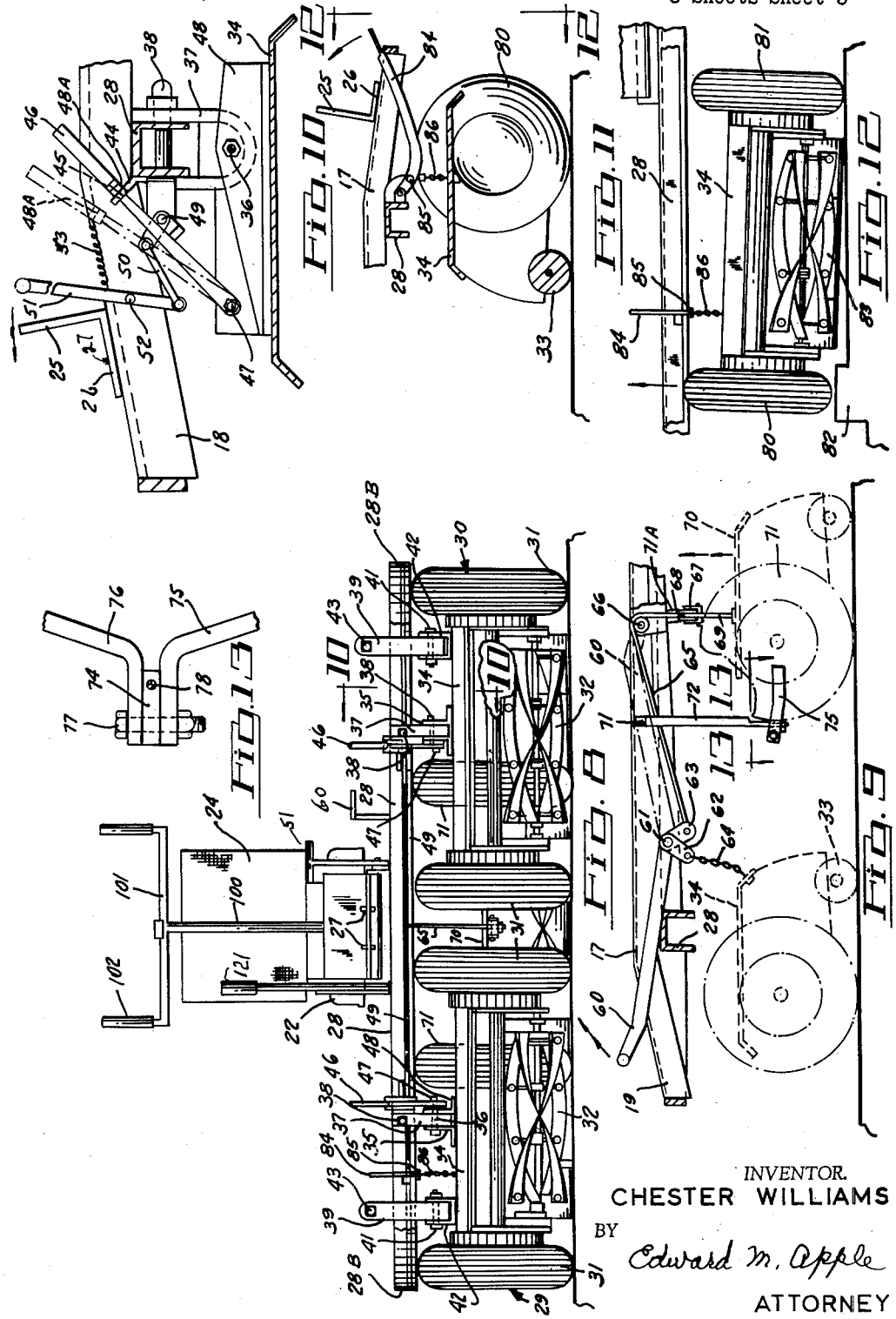

3,097,465
RIDING LAWN MOWER
Chester Williams, 5651 Carpenter Road, Ypsilanti, Mich.
Filed Feb. 16, 1961, Ser. No. 89,847
5 Claims. (Cl. 56—7)

This invention relates to power mowers, and has particular reference to a riding lawn mower, suitable for institutional, commercial, or park use, or for use on estates and the like where large expanses of grass are to be cut.

An object of the invention is to generally improve devices of the character indicated, and to provide a reel type, power driven, riding lawn mower, which is simple in construction, light in weight, economical to manufacture, easy to handle, highly maneuverable, and one which requires comparatively little power to operate.

Another object of the invention is to provide a reel type, power driven, riding lawn mower which has a substantially long, weight supporting, cross member, which serves as an "outrigger" to give it great lateral stability.

Another object of the invention is to provide a reel type, power lawn mower, wich cuts a wide swath, and is impossible to tip over on a steep grade, because of its low center of gravity, and its distribution of weight over a wide area.

Another object of the invention is to provide a riding lawn mower, which is power driven and which is provided with a gang of reel type mowers, which are driven in conventional manner by frictional engagement of their wheels with the ground, while being moved over the ground by a conventional internal combustion engine, which is mounted at the rear of the device.

Another object of the invention is to provide a riding power driven, reel type lawn mower, which is constructed and arranged so that the driving wheel moves in exactly the same radius as the outside wheels on the mower, thereby preventing side slip and skidding and enabling the device to pivot on one inside wheel whereby to effect close turns, and the ability to cut around trees and the like.

Another object of the invention is to provide a device of the character indicated, employing a gang of mowers of the reel type, which is constructed and arranged, so that the wheels, rollers, and chassis of the reel type mowers, carry a substantial part of the load of the device.

Another object of the invention is to provide a device of the character indicated, in which the wheels of the front mowers are principal load carrying elements, and the cutting bars and the rollers of the mowers are arranged to be rocked upwardly and out of contacting relation with the ground, so that the device may easily be transported, without danger of injuring the reels or the cutting bars during transportation.

Another object of the invention is to provide a device of the character indicated, having a gang of reel type mowers, which is provided with novel means for lifting the cutting bars and rollers of the several mowers out of cutting position, while certain of the wheels of the mowers carry the front load of the device.

Another object of the invention is to provide a device of the character indicated, which is provided with novel means for locking the several reel type mowers in and out of grass cutting position, and means to release such locking means.

Another object of the invention is to provide novel means for mounting the gang of conventional reel type mowers, so that individually they may readily negotiate uneven terrain.

Another object of the invention is to provide a device of the character indicated, with means to lift one end, including a wheel, of one of the reel type mowers for negotiating curbs and the like, while the wheel at the opposite end of the said mower remains in contact with the ground.

Another object of the invention is to provide a device of the character indicated, the frame of which consists of a central member and a cross member, to which at least two conventional reel type mowers are attached, which mowers carry a substantial part of the load of the device through their chassis and wheels, and which said mowers are normally held in axial alignment, but are free to individually rock in forward and backward directions, as well as sidewise.

Another object of the invention is to provide a device of the character indicated, which is constructed with at least one pair of forwardly mounted reel type mowers, and a rear mower, the latter being centrally pivoted behind the two front mowers and arranged for vertical and horizontal movement, there being novel means associated with the said rear mower for lifting it and locking it out of grass cutting position.

Another object of the invention is to provide a device of the character indicated, with novel means for propelling the device forward and backward.

Another object of the invention is to provide a device of the character indicated with novel means for adjusting the turning radius of the device.

Another object of the invention is to provide a reel type riding, lawn mower, with power means for propelling it forwardly and in reverse, which are constructed and arranged so that it obviates the necessity of using a conventional gear type transmission and differential.

Another object of the invention is to provide a reel type, riding lawn mower, with novel means for power driving the device from the rear, whereby to provide the utmost in maneuverability, better traction in all directions, and to effect power steering of the device when in operation.

Another object of the invention is to provide a reel type mower, which is constructed and arranged so that it may be turned in a very small radius so that the mower may be used in confined places and for close cutting around trees, shrubs, and the like.

Another object of the invention is to provide a power driven, reel type lawn mower, wherein the forward and reverse movement of the device is effected by the simple expedient of rocking the power source about a horizontal axis.

The foregoing and other objects and the advantages of the invention will become more apparent as the description proceeds, reference being made from time to time to the accompanying drawings, forming part of the within disclosure, in which drawings:

FIG. 1, is a side elevational view of a device embodying the invention with broken lines to show the adjustability of certain of the parts.

FIG. 2, is a section taken on the line 2—2 of FIG. 1, when the parts are in adjusted position for reverse drive.

FIG. 3, is a section taken on the line 3—3 of FIG. 1, with the parts in normal forward driving position.

FIG. 4, is a plan view of the device shown in FIG. 1.

FIG. 5, is a section taken on the line 5—5 of FIG. 4.

FIG. 6 is a section taken substantially on the line 6—6 of FIG. 4.

FIG. 7, is a view taken on the line 7—7 of FIG. 1.

FIG. 8, is a front elevational view of the device shown in FIGS. 1 and 4.

FIG. 9, is a section taken substantially on the line 9—9 of FIG. 4.

FIG. 10, is a section taken substantially on the line 10—10 of FIG. 8.

FIG. 11, is a section, taken substantially on the line 11—11 of FIG. 4.

FIG. 12, is a front elevational view of the left mower in FIG. 8 with one wheel lifted and the other on the ground in load carrying position and is taken on the line 12—12 of FIG. 11.

FIG. 13, is a section taken substantially on the line 13—13 of FIG. 9.

Referring now more particularly to the drawings, it will be understood that in the embodiment herein disclosed, the reference character 17, indicates the longitudinal frame member which constitutes the back bone of the device. The frame member 17, consists of a comparatively wide sheet of heavy gage metal, either a stamping or a casting, which has down-turned side flanges 18, which serve to reinforce the member 17, and provide supporting means for certain of the working parts hereinafter described.

Referring to FIG. 1, it will be seen that the member 17, is curved to form a leg supporting section 19, and a drive wheel supporting section 20. The central section 21, of the member 17 is flat and supports a seat cushion 22. A backrest bracket 23, is secured, by welding or other suitable means, to the section 20, and is provided with a backrest cushion 24. The leg supporting section 19, is provided with a footrest 25, which is adjustable on the leg rest portion 19, by longitudinal slots 26, formed in the member 19, which are arranged to receive bolts 27, which extend through openings formed in the member 25, and the slots 26.

Secured to the underside of the member 17, by welding or other suitable means, is an inverted channel-like cross member 28, which serves as an "outrigger" and another principal frame member, and means for supporting the front mowers, as hereinafter described. The cross member 28, is braced by angular members, 28A which are secured at one end to the member 28 and at the other to the member 17. A bumper 28B extends around the front end of the device and is secured by any suitable means to the members 17 and 28.

Secured to the cross member 28 is a pair of conventional reel type mowers 29 and 30 (FIG. 8). Each of the mowers 29 and 30 have driving wheels 31, which drive the cutting reels 32, as in conventional practice, as the wheels 31 are moved over the ground. Each of the mowers 29 and 30 is provided with rollers 33 and a plate-like member 34, which may be a stamping or a casting, and comprises part of the chassis of the reel type mower. In this instance the plates 34 serve as mounting means for attaching the reel type mowers 29 and 30 to the cross member 28. Each plate 34 is provided with a pair of angular members 35, which are welded, or otherwise secured, to the top of the plate 34. I also contemplate making the plate 34 in the form of a casting with members 35 and other elements formed integrally therewith. The upstanding legs of each member 35 are provided with holes for receiving a bolt 36 which serves as a pivot for the U-shaped supporting arm 37, which is provided with a bearing block 37A (FIG. 5), which is bored to receive the pivot 36. The arm 37 is pivoted, as at 38, to the cross member 28 (FIGS. 5 and 8). This allows each mower 29 and 30 to rock forwardly and backwardly, as well as rock from end to end. In order to prevent the radial movement of each mower 29 and 30 about the axis of the supporting arm 37, I provide a member 39 (FIGS. 6 and 8) which consists of a U-shaped member (FIGS. 1, 6 and 8), to the inside of which is welded a bearing block 40, which is bored to receive a bolt 41, or the like, which also extends through the legs of a channel member 42, which in turn is welded or otherwise secured to the plate 34. This permits the mower to rock forwardly and backwardly on the bolt 41, as well as on the bolt 36. The member 39 slides freely over the channel member 28, so that the mower is free to rock from end to end. The downward movement of the end of the mower is limited by a bolt 43, which extends through the member 39, above the cross member 28, and the upward movement is limited by the block 40. In order to lock down the rollers 33, and the cutting bar (not shown) and the rear end of each mower against pivoting on the pivots 36 and 40 to permit cutting heavy grass and the like, I provide a bracket 44 (FIG. 10) which is secured to the cross member 28 by any suitable means, and is provided with a cut-out portion, or recess 45, for receiving the locking rod 46, which is pivoted, as at 47, to a member 48, which is welded or otherwise secured to the plate 34. The rod 46 is threaded partially to receive the adjusting and locking nuts 48A, so that varying degrees of adjustment may be effected. Each rod 46 of each front mower may simultaneously be moved out of locking position by means of a transverse rod 49 (FIGS. 4 and 10) and linkage 50, which is actuated by a lever 51 (FIG. 10), which is manually operated by the operator's foot or hand. The lever 51 is pivoted, as at 52, to the flange 18 of the member 17 and is spring backed as at 53. When the lever 51 is in the position shown in FIG. 10, the locking rods 46 are in locked position to prevent the front mowers 29 and 30 from rocking up at the back while the mowers are in use.

When it is desired to transport the device over gravel roads, highways and the like, it is necessary to lift the rollers 33, the cutting bars (not shown) and the reels, so that they will be out of damaging proximity to the ground. At the same time the wheels of each front mower must remain on the ground, as they are principal load carrying elements, as previously indicated. To accomplish this lifting action of the front mowers, I pivot the rear of the front mowers upwardly about the axes of the wheels 31. In order to do so, I provide a lever 60, which is secured to a rod 61, which is rotatably supported in bearing brackets (not shown) secured to the underside of the member 17. The rod 61 extends beyond the member 17 on both sides thereof, and is provided with levers 62 and 63 (FIG. 9) for each front mower. The lever 62 is connected to a chain 64 which in turn connects to the plate 34 to rock upwardly the rear end of the mower. Each front mower is so connected. The lever 63 (FIG. 9) is connected to a cable 65, which passes through a loom (not shown) secured to the member 17, and over a pulley 66, or the like, also secured to the member 17, and is then connected, as at 67, to a yoke, in which rotates a pulley 68 (FIG. 7), which rides under an arcuate rod 69, which is secured at each end to the plate 70 of a third or rear mower 71 and always centers the lift. The mower 71 is mounted below the median line of the member 17, behind the front mowers 29 and 30, so that the combined widths of the three mowers will cut a wide swath.

The rear mower 71 (FIG. 9) is mounted on an arm 72 which is pivoted, as at 73, to the underside of the member 17. The lower end of the arm 72 engages a bearing block 74 (FIG. 13), which is secured between the arms 75 and 76, which are in turn secured to the chassis of the mower. The bearing block 74 is pivoted in two places, as at 77 and 78, (FIG. 13) to permit the mower 71 to be lifted upwardly by the cable 65 and to permit it to rock from end to end in order to negotiate uneven terrain. When the rear ends of the front mowers 29 and 30 are rocked upwardly, the rear mower 71 is lifted up bodily off the ground by the cable 65, as shown by the dotted lines (FIG. 1). In this condition the mower 71 is held against end wise movement by brackets 71A (FIG. 1) secured to the member 17, which brackets 71A engage the rod 69 when the mower 71 is elevated.

Another feature of my invention is shown in FIG. 12. This permits one wheel 80 of the front mower 29 to be lifted off the ground, so that the mower can travel over a low curb 82 or the like, while the other wheel 81 remains on the grass for load carrying purposes and traction. With this arrangement, part of the reel 83 remains in poistion to cut the grass inside the curb 82. To effect this wheel lifting operation, I provide a lever 84, (FIGS. 4 and 11), which is pivoted to a bracket, as at 85, which is secured by any suitable means to the cross member 28. A chain 86 or other suitable linkage connects the lever 84 with the plate 34, so that upon the rearward swinging of the lever 84, that end of the mover is lifted off the ground.

The rear end of the device is supported by a drive wheel 90, which is mounted for rotation on a shaft 91 which rotates in a bearing member 92, secured to the lower end of a yoke 93. The yoke 93, is carried at the end of a vertical shaft 94, which in turn rotates in a suitable bearing member (not shown) mounted in the portion 20 of the frame 17. The upper end of the shaft 94 is covered with a removable cap 95. In order to limit the turning radius of the shaft 94, I provide a stop 96 (FIG. 4) on the shaft 94, which engages set screws 97 mounted on the top of the yoke 93. The yoke 93 is provided on either side with quadrants 98, which have secured thereto, cables 99, which extend forwardly to a drum (not shown) secured to the lower end of the steering rod 100, which has a cross arm 101 and hand grips 102, whereby the device may be steered through the rear wheel 90. When the wheel 90 is set in one direction, it will move constantly in that direction until its direction is again changed. This is an important feature of the invention, as it provides power steering for the device. It also enables the device to pivot in the same radius as the radius of travel of the drive wheel, and permits the device to be propelled in a small radius about a tree, or the like. The rear wheel 90 is propelled by a gasoline engine 103, which is attached to a mount 104, which is pivoted, as at 105 (FIG. 4) to an extension 106, formed on the yoke 93, whereby the mount 104 may be rocked upwardly and downwardly to effect the forward and reverse drive of the wheel 90 as hereinafter described. A jack shaft 107 is mounted for rotation on suitable bearings carried on the extension 106. The jack shaft 107 has mounted for rotation therewith, a sprocket wheel 108, which carries a chain 109, which in turn drives a sprocket 110, secured to the wheel 90. The jack shaft 107 also carries a pair of V pulleys 111 and 112 and a third V pulley 113. The pulleys 111 and 112 are driven in one direction by V belts 114 and 115, which pass over pulleys 116 and 117 carried on the engine shaft 118. The V pulley 113 is driven in a reverse direction by frictional engagement with a reverse V pulley 119, when the engine mount 104 is rocked upwardly. When the mount 104 is so rocked upwardly, the belts 114 and 115 are made slack and the reverse motion of the jack shaft 107 is then imparted to the drive wheel 90. I also contemplate the use of a speed reduction assembly between the engine shaft 118 and the pulleys 116, 117 and 119, so that the driving speed may be greatly reduced. Otherwise, the device functions as described. The motor mount 104 is rocked on its pivot 105 by a cable 120, which attaches, at one end, to the engine 103 and at the other end to a lever 121, which is pivoted to a suitable bracket 122 secured to the member 17. When the lever 121 is pulled to the rear, the engine 103 is rocked forwardly, as shown by the broken lines in FIG. 1, this puts the device in reverse drive. When the lever 121 is forward, as shown in solid lines in FIG. 1, the engine is rocked backwardly or downwardly under its own weight and the belts 114 and 115 are made taut, and the device is in forward driving condition.

It will thus be seen that I have provided a novel forward and reverse driving mechanism, without the use of a conventional transmission, or differential mechanism, such as now employed with riding lawn mowers of this character.

It also will be seen that I have provided a riding power lawn mower of novel construction and arrangement, which will perform the results identified in the objects heretofore set forth in this disclosure.

It is believed that the operation of the device is obvious from the foregoing description.

Having described my invention, what I claim and desire to secure by Letters Patent is:

1. In a device of the character described, including a longitudinal frame member, a cross member secured to said first named member, and a power driven wheel for driving and steering said device, the combination of a pair of conventional wheel driven, reel type mowers positioned under and supporting opposite ends of said cross member said mowers being secured to said cross member by pivotable means for rocking each of said mowers about its longitudinal axis and its transverse axis.

2. The structure of claim 1, including means for lifting and locking one end, including a wheel, of either of said mowers out of contact with the ground, while the other wheel of said mower remains in contact with the ground.

3. The structure of claim 1, in which each of the said mowers is provided with means to limit the rocking motions of said mower.

4. The structure of claim 1, in which said longitudinal frame is an integrated member curved downwardly at the front end to provide a footrest, and is curved upwardly at the rear end to provide clearance for said driving and steering wheel.

5. The structure of claim 1, including a third mower mounted for universal action near the center of said longitudinal frame, means for elevating said last named mower and means for aligning and stabilizing said last named mower when elevated.

References Cited in the file of this patent

UNITED STATES PATENTS

| | | |
|---|---|---|
| 2,475,671 | McCartney | July 12, 1949 |
| 2,672,000 | Speiser | Mar. 16, 1954 |
| 2,704,921 | Cunningham | Mar. 29, 1955 |
| 2,764,864 | Kinkead | Oct. 2, 1956 |
| 2,765,861 | Ekas | Oct. 9, 1956 |
| 2,792,898 | Mast | May 21, 1957 |
| 2,919,756 | Knipe | Jan. 5, 1960 |
| 2,935,333 | Ekas | May 3, 1960 |
| 2,974,463 | Lewis | Mar. 14, 1961 |